Oct. 30, 1928.

S. CLAUSEN ET AL 1,689,423

FILLER FEED FOR SCRAP BUNCH CIGAR MACHINES

Filed May 17, 1927    3 Sheets-Sheet 1

INVENTOR
Sigurd Clausen
Charles V. Lindblad
BY
Sydney Wescott
ATTORNEY

Oct. 30, 1928.

S. CLAUSEN ET AL 1,689,423

FILLER FEED FOR SCRAP BUNCH CIGAR MACHINES

Filed May 17, 1927

3 Sheets-Sheet 2

INVENTOR
Sigurd Clausen
Charles V. Lindblad
BY
Sydney J. Prescott
ATTORNEY

Oct. 30, 1928.
S. CLAUSEN ET AL
1,689,423
FILLER FEED FOR SCRAP BUNCH CIGAR MACHINES
Filed May 17, 1927  3 Sheets-Sheet 3
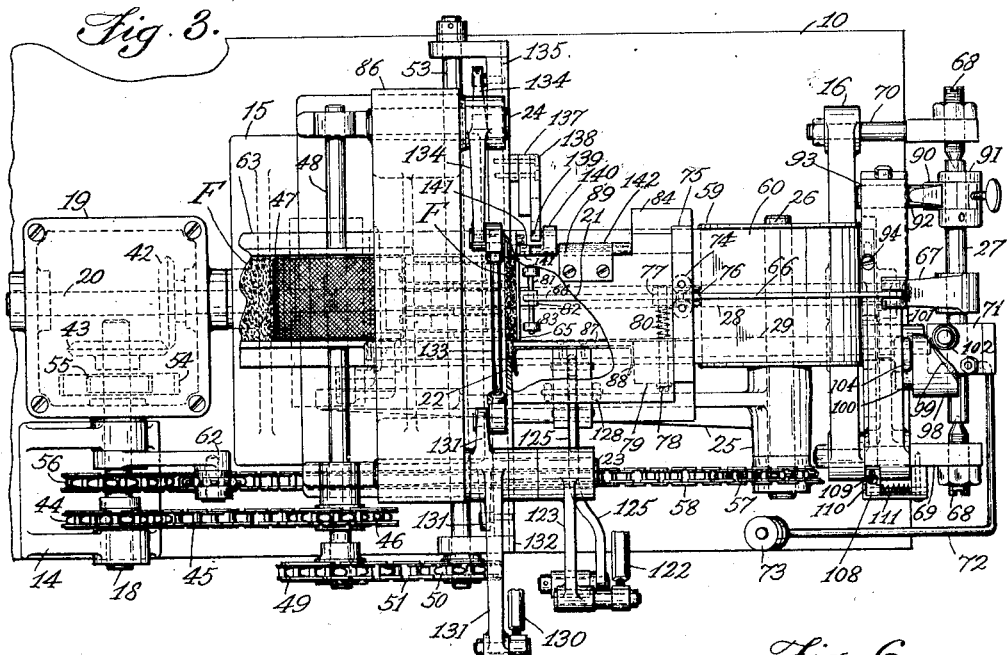
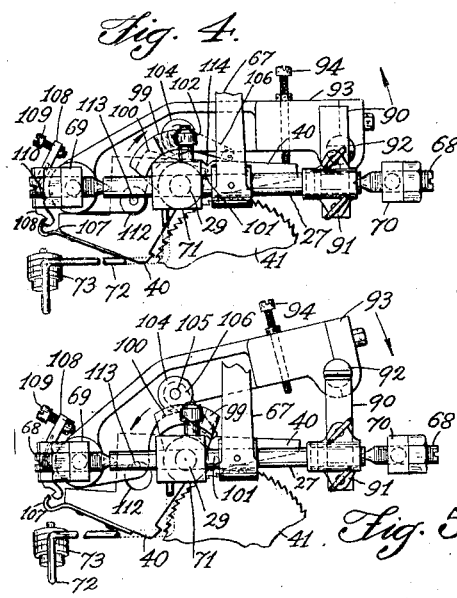
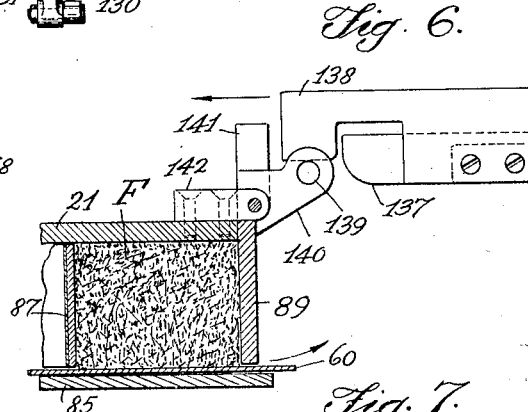
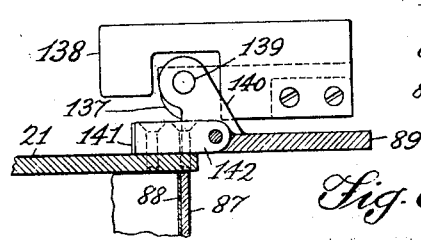
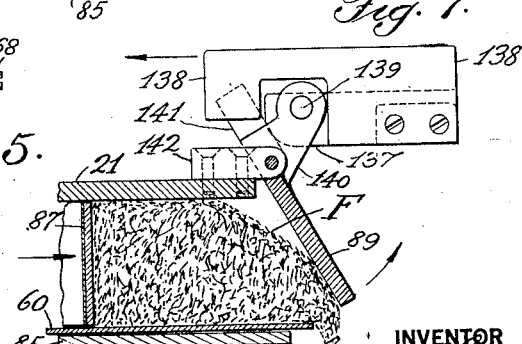
INVENTOR
BY
ATTORNEY Patented Oct. 30, 1928.

1,689,423

UNITED STATES PATENT OFFICE.

SIGURD CLAUSEN AND CHARLES V. LINDBLAD, OF BROOKLYN, NEW YORK, ASSIGNORS TO INTERNATIONAL CIGAR MACHINERY COMPANY, A CORPORATION OF NEW JERSEY.

FILLER FEED FOR SCRAP-BUNCH-CIGAR MACHINES.

Application filed May 17, 1927. Serial No. 192,053.

This invention relates to an improvement in a filler feed for scrap-bunch cigar machines, its underlying object being the production of a machine in which the delivery of scrap filler to bunch forming mechanism is more uniform than heretofore. This object is achieved by measuring the filler for bunch charges individually in a density-measuring chamber having a movable wall in the form of a weight-controlled plate. Filler fed into the chamber moves this plate ahead when enough has entered the chamber to reach a predetermined density which corresponds to the resistance of the weight, the latter being adjustable. As the plate moves ahead, it raises the weight to a predetermined point at which a trip lever is actuated and sets in motion mechanism for stopping the feed of filler into the chamber. After the plate has advanced to the end of its travel, a gate in one side of the chamber opens, and a plunger in the other side of the chamber advances across said chamber, thereby ejecting the measured charge sidewise from the chamber, as into a chute which guides it into the bight of the Chianti belt of a bunch rolling mechanism, not shown. With this and other objects not specifically mentioned in view, the invention consists in certain constructions and combination which will be hereinafter fully described and then specifically set forth in the claims hereunto appended.

Figure 1:
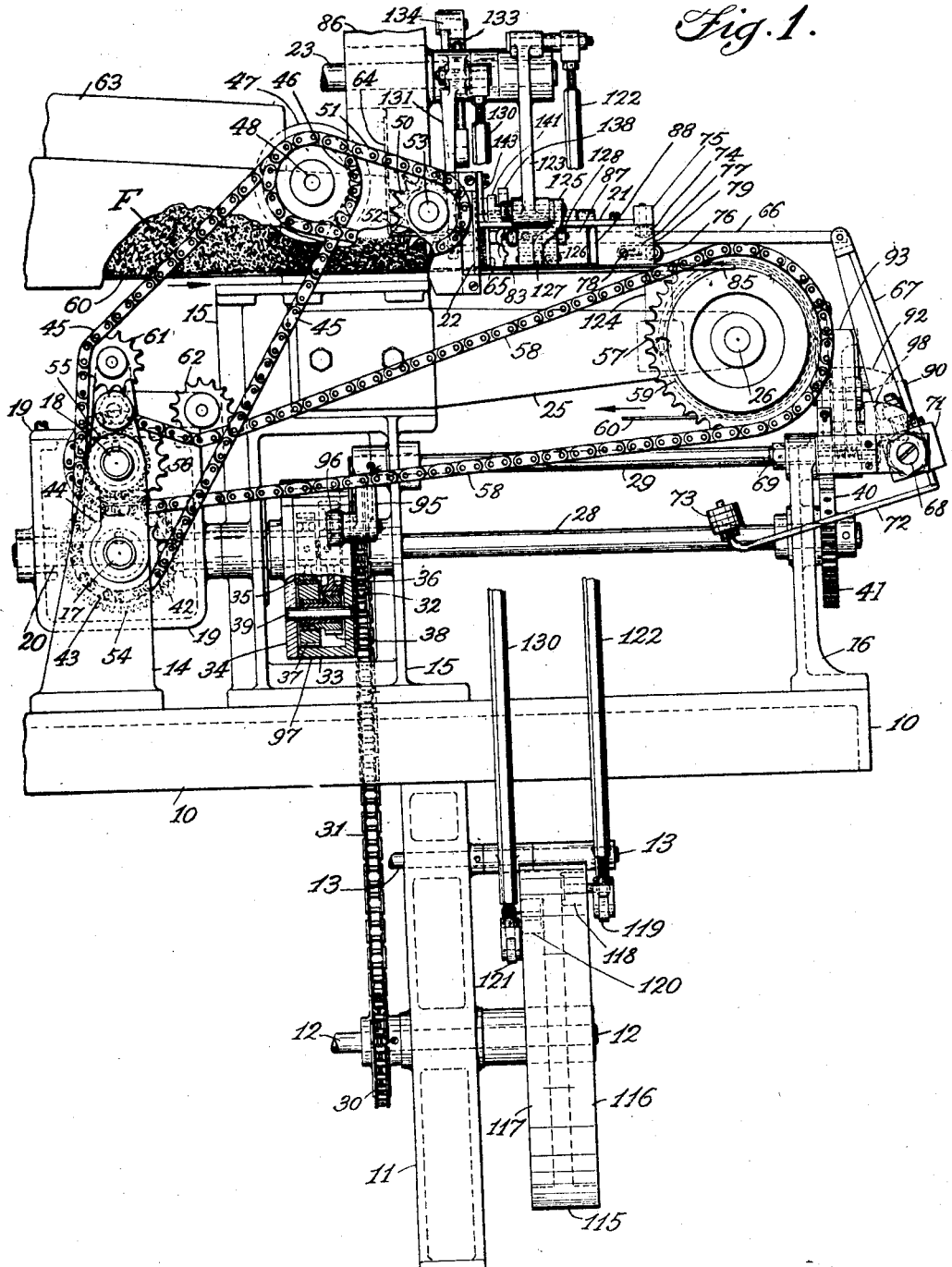
Figure 2:
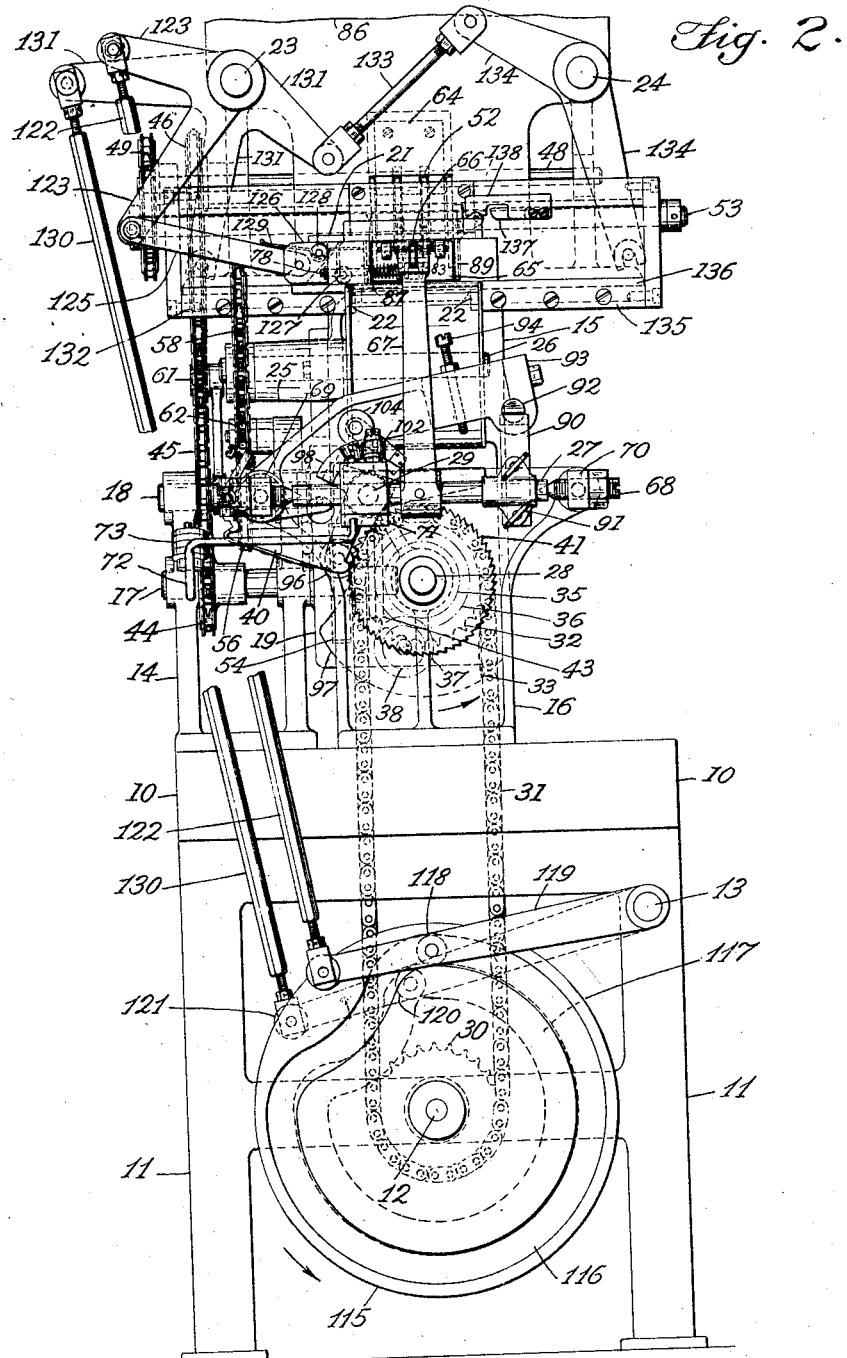

In the accompanying drawings, in which like characters of reference indicate the same or like parts, Fig. 1 is front elevation of a device constructed in accordance with invention; Fig. 2 is a side elevation of the same; Fig. 3 is a top view of the same; Fig. 4 is a detail view showing the feed controlling trip lever in its tripped position; Fig. 5 is a detail view showing the trip lever in a partly raised position just high enough to allow the trip lock to slip under the trip finger; Fig. 6 is an enlarged detail view showing the filler chamber gate in locked position; Fig. 7 is a similar view showing the gate in partly opened position; and Fig. 8 is a view showing the gate in open position.

In carrying the invention into effect, there is provided a density-measuring chamber just large enough to contain sufficient filler for one bunch charge at given density, means for feeding filler into said chamber, and means associated with said chamber for stopping said feeding means when the filler in said chamber reaches that pretermined density. In the best constructions contemplated, there is further provided means for ejecting the measured bunch charges sidewise from said chamber. These various means and parts may be varied in construction within the scope of the claims, for the specific construction selected to illustrate the invention is but one of many possible concrete embodiments of the same. The invention, therefore, is not to be restricted to the precise details of the structure shown and described.

Referring to the drawings: The improved filler feed is mounted on the bed 10 of a cigar bunch making machine, this bed being supported by pedestals 11 in which a camshaft 12 and a fulcrum shaft 13 are supported. On the bed 10 are mounted the stands 14, 15 and 16. The stand 14 supports sprocket drive shafts 17 and 18 and a gear housing 19 in which is journaled an actuating shaft 20. The stand 15 supports the superstructure including a filler measuring chamber 21, charge severing knives 22—22, and fulcrum shafts 23 and 24; and it also supports a bracket 25 which in turn supports a conveyor shaft 26. The stand 16 supports a tripper shaft 27, and, together with the stand 15, carries a feed control shaft 28 and a rockshaft 29.

The motor-driven shaft 12 carries a sprocket 30 which, through a chain 31, drives a sprocket 32 fastened to the housing 33 of a planetary gear transmission which forms the connection between the abutting shafts 20 and 28, the housing 33 turning loosely on the shaft 28, and the cover 34 of the housing 33 turning on the shaft 20. On the shaft 20, within the housing 33, is mounted the sun gear 35, and on the shaft 28 is mounted the sun gear 36, the sun gears 35 and 36 meshing with the planetary gears 37 and 38, respectively, on a shaft 39 which is supported by the housing 33 and cover 34. The shaft 28 is normally held stationary by the engagement of a pawl 40 with a ratchet 41 mounted on said shaft, so that the rotation of the sprocket 32, by turning the housing 33, will rotate the planetary gear 38 around the sun gear 36, thus causing the planetary gear 37, which is keyed to the gear 38, to turn the sun gear 35 and the shaft 20, as it travels around the gear 35.

A bevel gear 42, mounted on the shaft 20, is in mesh with a bevel gear 43 on the shaft 17 on which is mounted a sprocket 44 driving, through a chain 45 and sprocket 46, a filler roller 47 mounted on a shaft 48 and, through sprockets 49 and 50 connected by a chain 51, the star wheels 52 or feed rollers on a shaft 53. The shaft 17 also carries a spur gear 54 which drives a spur gear 55 on the shaft 18, the latter having a sprocket 56 connected with a sprocket 57 on the shaft 26 by a chain 58 and driving a pulley 59 of a feed belt 60. The roller driving chain 45 and belt driving chain 58 are tightened by adjustable idle sprockets 61 and 62 respectively.

The filler F issuing from a magazine 63 through which it is carried by the feed belt 60, after being compacted by the roller 47, is propelled by the star wheels or feed rollers 52 past the separated knives 22—22 which are periodically closed to cut off charges, into the density-measuring chamber 21. To prevent the filler from being carried around the star wheels, a slotted plate 64 is provided through which the star wheels project into the tobacco mass. As the filler enters the chamber 21, it encounters and is arrested by a plate 65 which forms one wall of the chamber and is attached by a rod 66 to a lever 67 pinned to the shaft 27 which is pivoted on adjustable screws 68 held by studs 69 and 70 in the stand 16 and to which is attached, by a block 71 clamped on it, a rod 72 carrying a weight 73, the tendency of the weight being to push the rod 66 and the plate 65 forward against the advancing filler. After a sufficient quantity of filler has accumulated in front of the plate 65, the pressure of the advancing filler overcomes the effect of the weight 73, whereupon the plate 65 commences to retreat, thereby lifting the weight 73. The rod 66 is guided between rollers 74—74 attached to a block 75, and it rests on a roller 76 which is mounted in a link 77 turning on a bolt 78 in a block 79 and is pressed up against it by a torsion spring 80. Near its forward end, attached to a pin 81 by which it is fastened to a lug 82 of the plate 65, the rod 66 carries the rollers 83 which engage the under side of the cover plate of the chamber 21. This cover plate is supported at one end by blocks 79 and 84 mounted on the feed belt supporting table 85 which is attached to the superstructure frame 86 carried by the stand 15, and to a bracket 124 fastened to the conveyor shaft bracket 25; and at the other end is fastened to a frame 86 by the angle 143 forming part of the cover of the chamber 21.

The density-measuring chamber 21, in which the weight-controlled plate 65 arrests and is then carried along by the advancing filler, has for its bottom the feed belt 60 supported by the table 85, and for its top the cover before referred to. It is closed at one side by a plunger 87, and on the opposite side by a swinging gate 89. After the plate 65 has been forced back by the filler far enough, a trip lock 90, mounted on the shaft 27 by an adjustable yoke 91, is disengaged from the trip finger 92 of a trip lever 93 pivoted on the stud 69, by the turning of the shaft 27 caused by the rearward movement of the lever 67. The angular adjustment of the yoke 91 on the shaft 27 determines the length of stroke of the plate 65, and this, together with the filler density regulated by the adjustment of the weight 73, exactly predetermines the density of each individual bunch charge. Thus, when just the proper amount of filler for one bunch has accumulated in the chamber 21, the trip lever 93 is released and drops down, its adjustable screw hitting the pawl 40 and knocking it out of engagement with the ratchet 41, thereby releasing the shaft 28. The turning resistance of the shaft 28 now being much smaller than that of the shaft 20 which includes the working resistances of the feed belt 60, the roller 47 and the star wheels 52 and the friction in their gear transmission and chain drives, the planetary gear 37 will travel around the sun gear 35 and the planetary gear 38 will drive the shaft 28 through the sun gear 36, while the shaft 20 will stand still, thereby stopping the feed belt 60, the roller 47, and the star wheels 52.

While the feed is at rest, the knives 22—22 come together, severing the charge in the chamber 21 from the remaining filler in the feeding means, and opening the gate, as will be described hereinafter; and then the plunger 87 crosses the chamber, ejecting its contents. As the charge is removed, the tobacco pressure against the plate 65 is released, so that the weight 73, if not restrained, would push it back into the path of the receding plunger. It is therefore necessary for the proper operation of the machine, not only that the plate 65 be held in its rear position until the plunger has returned to its resting place, but also that the filler feed does not restart until the plate 65 is in its forward position at the entrance of the chamber 21.

For this purpose, the shaft 29 at one end carries a lever 95 having a roller 96 engaging a cam 97 on the planetary housing 33, and at its other end carries a triple-acting cam 98 having the working surfaces 99, 100 and finger 101. The front face 99 engages a roller 102 mounted on a stud 103 in the block 71 and controls the plate 65; the side face 100 engages a roller 104 attached to a stud 105 in the trip lever 93 and controls the upward movement of the trip lever; and the finger 101 engages a latch 106 pivoted on the stud 105 and controls the downward movement of the trip lever. The pawl 40 is provided with a hook 107 which engages a catch 108 pivoted on the stud 69 when the pawl is hit by the trip lever 93, and thus prevents the pawl from falling back until the trip lever is again raised to its locked position where it engages a stop screw 109 in the catch 108 which is pivoted on a pin 110 and is held in engagement position by a spring 111.

At the time when the plunger 87 commences its forward movement, the cam 97 engages the roller 96, thereby turning the shaft 29 and causing the front face 99 of the cam 98 to enter behind the roller 102, pushing it to its extreme outer position and holding it therein, thereby holding the plate 65 stationary while the plunger ejects the charge and returns to its starting point. Then the side face 100 slides under the roller 104 and raises the trip lever 93, thereby disengaging the hook 107 of the pawl 40, allowing the pawl to drop until the hole 112 in the pawl is engaged by a pin 113 in the trip lever, thus preventing the pawl from engaging the ratchet (Fig. 5). As the trip lever is raised by the face 100 of the cam 98, the latch 106 gradually slides into a notch 114 in the top surface of the pawl 40, thereby holding the trip lever in its raised position while the cam moves back. When the cam arrives in its final or starting position, the finger 101 on its rear surface slides under and raises the latch 106, thereby allowing the trip finger 92 of the trip lever 93 to drop into engagement with the trip lock 90 which by that time has reached its uppermost position, corresponding to the foremost position of the plate 65, this final dropping of the trip lever into lock position lowering the pin 113 sufficiently to cause the pawl 40 to engage the ratchet 41, thereby stopping the shaft 28 and setting the feeding means into action for the next charge.

If the device is operated with the magazine empty, or insufficiently filled to deliver a full charge, so that there will be not enough pressure to move the plate 65 to the end of its stroke, or if the plate 65 has not advanced during the charging period for any other reason, it is pushed into the tripping position automatically before the plunger 87 is actuated. For this purpose, the front surface 99 of the cam 98 is made wedge or spiral shaped, thereby enabling its forward edge to engage the roller 102 on the block 71, even if the weight 73 is in its lowermost position, so that, if the plate 65 is still in its forward or in any intermediate position when the cam 98 moves forward, the surface 99, instead of merely holding the plate 65 back until the plunger 87 has cleared its path, will then actually pull it into its rear position.

After the feed has stopped, the charge is severed by closing the knife blades 22—22, and the gate 89 is opened, whereupon the plunger 87 ejects the charge sidewise from the chamber 21.

On the main drive shaft 12 is mounted the cam 115 which has the tracks 116 and 117, the outer track 116 engaging a roller 118 and controlling a lever 119, and the inner track 117 engaging a roller 120 and controlling a lever 121, both levers 119 and 121 being pivoted on the fulcrum shaft 13.

The front lever 119 is connected by a rod 122 with one arm of a bell crank lever 123 fulcrumed on the shaft 23 supported by the top frame 86. The other arm of the lever 123 is connected by a link 125 to a block 126 on which the plunger 87 is mounted. The block 126 runs on a bottom roller 127 and in its forward movement is guided under the cover of the chamber 21 by rollers 128, a spring 129 imbedded in a slot provided for this purpose pressing down on the link 125.

The rear lever 121 is connected by a rod 130 with the outside arm of a triple lever 131 fulcrumed on the shaft 23. The middle arm of the lever 131 engages a pin in the left hand knife block 132, and the inside arm is linked by an adjustable rod 133 to one arm of the double lever 134 fulcrumed on the shaft 24 in the top frame 86, the other arm of the lever 134 engaging a pin in the right hand knife block 135. The knives 22—22, being attached to blocks 132 and 135 which slide in guides 136 on the frame 86, thus move toward each other once every revolution of the cam 115, thereby severing the charge in the chamber from the remaining filler in the feeding means.

On the knife block 135 are attached the gate opener 137 and the gate closer 138, the operation of which is shown in Figs. 6, 7 and 8. When the knife blocks are moving towards each other, the gate closer 138, which normally rests on the pin 139 in a gate lug 140, holding it down, slides over the pin 139, thereby setting it free to move. The gate opener 137 then engages the nose 141 projecting upwardly from the gate 89 and, pushing against it, swings the gate on its hinge 142, thereby raising the same. When the knives are together, the bottom surface of the gate opener 137 rests on the top surface of the nose 141 and the gate 89 is completely open, allowing the charge to be ejected by the plunger 87 which by this time has moved across the chamber 21 (Fig. 8). As the knives return to their open positions to allow the next charge to pass, the gate closer 138 slides back, permitting the gate to drop until in its final position, the gate closer 138 has moved back over the pin 139 holding the gate closed. If, for any reason, the gate should not drop of its own weight, the rear surface of the gate closer 138 will engage the pin 139 on its backward stroke and force the gate into closed position.

In view of the foregoing, a detailed description of the operation of the device is deemed unnecessary and is therefore omitted in the interest of brevity.

What is claimed is:

1. The combination with a density-measuring chamber, of means for feeding filler into said chamber, and means actuated by a wall of said chamber for stopping said feeding means when the filler in said chamber reaches predetermined density.

2. The combination with a density-measuring chamber, of means for feeding filler into said chamber, and means actuated by a wall of said chamber for stopping said feeding means when the filler in said chamber reaches predetermined density, said feeding means including a feed belt passing through and forming the bottom of said chamber.

3. The combination with a density-measuring chamber, of means for feeding filler into said chamber, and means actuated by a wall of said chamber for stopping said feeding means when the filler in said chamber reaches predetermined density, said feeding means including a feed belt passing through and forming the bottom of said chamber and also including compacting and feeding devices co-acting with said belt outside said chamber 4. The combination with a density-measuring chamber, of means for feeding filler into said chamber, and means actuated by a wall of said chamber for stopping said feeding means when the filler in said chamber reaches predetermined density, said stopping means including a weight-controlled actuating member forming an end wall of said chamber.

5. The combination with a density-measuring chamber, of means for feeding filler into said chamber, and means actuated by a wall of said chamber for stopping said feeding means when the filler in said chamber reaches predetermined density, said stopping means including operative connections and a trip mechanism for said feeding means operative only when the filler in said chamber is of the proper density.

6. The combination with a density-measuring chamber, of means for feeding filler into said chamber, and means actuated by a wall of said chamber for stopping said feeding means when the filler in said chamber reaches predetermined density, said stopping means including planetary gearing normally driving said feeding means and also including means controlled by the filler in said chamber for controlling the action of said gearing.

7. The combination with a density-measuring chamber, of means for feeding filler into said chamber, means actuated by a wall of said chamber for stopping said feeding means when the filler in said chamber reaches predetermined density, and means for separating the filler in said chamber from the remaining filler in said feeding means.

8. The combination with a density-measuring chamber, of means for feeding filler into said chamber, means associated with said chamber for stopping said feeding means when the filler in said chamber reaches predetermined density, and means for separating the filler in said chamber from the remaining filler in said feeding means, said separating means including two knives and means for moving said knives toward and away from each other across the path of the filler advanced by said feeding means.

9. The combination with a density-measuring chamber, of means for feeding filler into said chamber, means associated with said chamber for stopping said feeding means when the filler in said chamber reaches predetermined density, and means for separating the filler in said chamber from the remaining filler in said feeding means, said separating means including two inter-connected and cam-actuated knives reciprocating toward and away from each other across the path of the filler advanced by said feeding means.

10. The combination with a density-measuring chamber, of means for feeding filler into said chamber, means associated with said chamber for stopping said feeding means when the filler in said chamber reaches predetermined density, means for separating the filler in said chamber from the remaining filler in said feeding means, and means for ejecting the measured and separated filler sidewise from said chamber.

11. The combination with a density-measuring chamber, of means for feeding filler into said chamber, means associated with said chamber for stopping said feeding means when the filler in said chamber reaches predetermined density, means for separating the filler in said chamber from the remaining filler in said feeding means, and means for ejecting the measured and separated filler sidewise from said chamber, said ejecting means being in part actuated by said separating means.

12. The combination with a density-measuring chamber, of means for feeding filler into said chamber, means associated with said chamber for stopping said feeding means when the filler in said chamber reaches predetermined density, means for separating the filler in said chamber from the remaining filler in said feeding means, and means for ejecting the measured and separated filler sidewise from said chamber, said ejecting means including a cam-actuated ejecting plunger forming a side wall of said chamber.

13. The combination with a density-measuring chamber of means for feeding filler into said chamber, means associated with said chamber for stopping said feeding means when the filler in said chamber reaches predetermined density, means for separating the filler in said chamber from the remaining filler in said feeding means, and means for ejecting the measured and separated filler sidewise from said chamber, said ejecting means including a swinging gate forming a side wall of said chamber and actuated by said separating means.

14. The combination with a density-measuring chamber, of a feed belt passing through the bottom of said chamber, and means for stopping said belt when the filler in said chamber reaches predetermined density.

15. The combination with a density-measuring chamber, of a feed belt passing through the bottom of said chamber, means for stopping said belt when the filler in said chamber reaches predetermined density, and compacting devices coacting with said belt outside said chamber.

16. The combination with a density-measuring chamber, of a feed belt passing through the bottom of said chamber, and means for stopping said belt when the filler in said chamber reaches predetermined density, said stopping means including a weight-controlled actuating member forming an end wall of said chamber.

17. The combination with a density-measuring chamber, of a feed belt passing through the bottom of said chamber, and means for stopping said belt when the filler in said chamber reaches predetermined density, said stopping means including operative connections and a trip mechanism for said belt operative only when the filler in said chamber is of the proper density.

18. The combination with a density-measuring chamber, of a feed belt passing through the bottom of said chamber, and means for stopping said belt when the filler in said chamber reaches predetermined density, said stopping means including planetary gearing normally driving said belt and also including means controlled by the filler in said chamber for controlling the action of said gearing.

19. The combination with a density-measuring chamber, of a feed belt passing through the bottom of said chamber, means for stopping said belt when the filler in said chamber reaches predetermined density, and two knives and means for moving said knives toward and away from each other across the path of the filler advanced by said belt.

20. The combination with a density-measuring chamber, of a feed belt passing through the bottom of said chamber, means for stopping said belt when the filler in said chamber reaches predetermined density, and means for ejecting the measured filler sidewise from said chamber.

In testimony whereof, we have signed our names to this specification.

SIGURD CLAUSEN.
CHARLES V. LINDBLAD.